US007135538B2

(12) United States Patent
Glasgow et al.

(10) Patent No.: US 7,135,538 B2
(45) Date of Patent: Nov. 14, 2006

(54) TRANSPARENT POLYCARBONATE-POLYSILOXANE COPOLYMER BLEND, METHOD FOR THE PREPARATION THEREOF, AND ARTICLE DERIVED THEREFROM

(75) Inventors: Katherine Glasgow, Evansville, IN (US); Adam Zerda, Evansville, IN (US); Dibakar Dhara, Bangalore (IN); Vikram Kumar, Bangalore (IN); Matthew Robert Pixton, Mt. Vernon, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/950,100

(22) Filed: Sep. 24, 2004

(65) Prior Publication Data
US 2005/0101757 A1 May 12, 2005

Related U.S. Application Data

(60) Provisional application No. 60/519,370, filed on Nov. 12, 2003.

(51) Int. Cl.
*C08G 64/00* (2006.01)

(52) U.S. Cl. .................. 528/196; 524/155; 524/164; 524/394; 528/198

(58) Field of Classification Search ............... 524/155, 524/164, 394; 528/196, 198
See application file for complete search history.

(56) References Cited

U.S. PATENT DOCUMENTS

| 3,635,895 A | 1/1972 | Kramer |
| 3,686,355 A | 8/1972 | Gaines, Jr. et al. |
| 3,691,257 A | 9/1972 | Kendrick et al. |
| 3,961,122 A | 6/1976 | Gaines, Jr. et al. |
| 4,027,072 A | 5/1977 | Molari, Jr. |
| 4,046,836 A | 9/1977 | Adelmann et al. |
| 4,569,970 A | 2/1986 | Paul et al. |
| 4,600,632 A | 7/1986 | Paul et al. |
| 4,636,552 A | 1/1987 | Gay et al. |
| 4,663,413 A | 5/1987 | Ward et al. |
| 4,675,361 A | 6/1987 | Ward, Jr. |
| 4,681,922 A | 7/1987 | Schmidt et al. |
| 4,746,701 A | 5/1988 | Kress et al. |
| 4,767,818 A | 8/1988 | Boutni |
| 4,788,252 A | 11/1988 | de Boer et al. |
| 4,861,830 A | 8/1989 | Ward, Jr. |
| 4,872,867 A | 10/1989 | Joh |
| 4,906,465 A | 3/1990 | Chaikof et al. |
| 4,929,510 A | 5/1990 | Ruckenstein et al. |
| 4,939,007 A | 7/1990 | Hu et al. |
| 4,963,595 A | 10/1990 | Ward et al. |
| 5,023,297 A | 6/1991 | Boutni |
| 5,109,076 A | 4/1992 | Freitag et al. |
| 5,126,428 A | 6/1992 | Freitag et al. |
| 5,182,317 A | 1/1993 | Winters et al. |
| 5,262,451 A | 11/1993 | Winters et al. |
| 5,322,882 A | 6/1994 | Okamoto |
| 5,451,632 A | 9/1995 | Okumura et al. |
| 5,530,083 A | 6/1996 | Phelps et al. |
| 5,565,291 A * | 10/1996 | Mayama et al. ........ 430/111.34 |
| 5,589,563 A | 12/1996 | Ward et al. |
| 5,597,887 A | 1/1997 | King, Jr. et al. |
| 5,608,026 A | 3/1997 | Hoover et al. |
| 5,616,674 A | 4/1997 | Michel et al. |
| 5,643,681 A | 7/1997 | Voorhees et al. |
| 5,648,070 A | 7/1997 | Brian, III et al. |
| 5,702,823 A | 12/1997 | Forrestal et al. |
| 5,738,902 A | 4/1998 | Forrestal et al. |
| 5,853,722 A | 12/1998 | Rollins et al. |
| 5,859,119 A | 1/1999 | Hoefflin |
| 5,863,627 A | 1/1999 | Szycher et al. |
| 5,962,563 A | 10/1999 | Forrestal et al. |
| 5,993,890 A | 11/1999 | Marchant et al. |
| 6,001,929 A | 12/1999 | Nodera et al. |
| 6,022,941 A | 2/2000 | Mestanza et al. |
| 6,048,947 A | 4/2000 | Oberhoffner et al. |
| 6,072,011 A | 6/2000 | Hoover |
| 6,087,468 A | 7/2000 | Hoeks et al. |
| 6,306,507 B1 | 10/2001 | Brunelle et al. |
| 6,309,723 B1 | 10/2001 | Ding et al. |
| 6,313,254 B1 | 11/2001 | Meijs et al. |
| 6,395,226 B1 | 5/2002 | Plunkett |
| 6,413,621 B1 | 7/2002 | Mayes et al. |
| 6,500,549 B1 | 12/2002 | Deppisch et al. |
| 6,559,270 B1 | 5/2003 | Siclovan et al. |
| 6,572,956 B1 | 6/2003 | Pickett et al. |
| 2003/0105226 A1 | 6/2003 | Cella et al. |
| 2003/0195295 A1 | 10/2003 | Mahood et al. |
| 2003/0225356 A1* | 12/2003 | Kulichikhin et al. ......... 602/54 |
| 2004/0220330 A1 | 11/2004 | DeRudder et al. |

FOREIGN PATENT DOCUMENTS

DE 40 16 417 A1 11/1991
EP 0 248 308 A2 12/1987

(Continued)

OTHER PUBLICATIONS

DE 40 16 417 A1; Publication Date Nov. 28, 1991 (translation of abstract only).

(Continued)

Primary Examiner—Terressa Boykin

(57) ABSTRACT

A composition includes a polycarbonate-polysiloxane block copolymer that has at least one polycarbonate block and at least one polysiloxane block, and a surface modifying agent that includes at least one polysiloxane segment. Increased levels of the surface modifying agent can be incorporated without compromising high transmittance and low haze. The compositions also exhibit improved hemocompatibility and are therefore useful for a variety of articles that may contact blood.

32 Claims, No Drawings

FOREIGN PATENT DOCUMENTS

| EP | 0 254 054 B1 | 1/1988 |
| EP | 0 387 570 B1 | 9/1990 |
| EP | 0 434 848 B1 | 7/1991 |
| EP | 0 517 927 B1 | 12/1992 |
| EP | 0 522 753 A2 | 1/1993 |
| EP | 0 600 196 A1 | 6/1994 |

OTHER PUBLICATIONS

EP 0 248 308; Publication Date Dec. 9, 1987 (translation of abstract only).

EP 0 387 570; Publication Date Sep. 19, 1990 (translation of abstract only).

JP 04-255062; Publication Date Aug. 14, 1992 (translation of abstract only).

JP 59-207922; Publication Date Nov. 26, 1984 (translation of abstract only).

ASTM Designation: D 256-04 Standard Test Methods For Determining The Izod Pendulum Impact Resistance Of Plastics (20 pgs).

ASTM Designation: D 1003-00 Standard Test method For Haze And Luminous Transmittance of Transparent Plastics (6 pgs).

Childs, M.A., et al "Surface Morphology of Poly(caprolactone)-b-poly(dimethylsiloxane)-b-poly(caprolactone) Copolymers: Effects on Protein Adsorption" American Chemical Society (2001) pp. 526-237.

ASME B46.1-1985 Surface Texture (Surface Roughness, Waviness, and Lay) (63 pgs).

ASTM D 638-03 "Standard Test Method for Tensile Properties of Plastics" (15 pgs).

ASTM D 4812-99 "Standard Test Method for Unnotched Cantilever Beam Impact Resistance of Plastics" (11 pgs).

ISO 10993-4 "Biological evaluation of medical devices—Part 4: Selection of tests for interactions with blood" (42 pgs).

Gemmell, Cynthia H., et al, "Platelet activation in whole blood by artificial surfaces: Identification of platelet-derived microparticles and activated platelet binding to leukocytes as material-induced activation events" J. Lab Clin Med vol. 125, No. 2, pp. 276-287 (1995).

LeGrand, D. G., et al "Surface Activity of Block Copolymers of Dimethylsiloxane and Bisphenol-A Carbonate in Polycarbonate" American Chemical Society, Division of Polymer Chemistry, vol. 11, No. 2, pp. 442-446 (1970).

International Search Report for International Application No. PCT/US2004/034660; Mailed: Feb. 22, 2005.

JP 02-029455; Publication Date: Jan. 31, 1990 (translation of abstract only).

* cited by examiner

TRANSPARENT POLYCARBONATE-POLYSILOXANE COPOLYMER BLEND, METHOD FOR THE PREPARATION THEREOF, AND ARTICLE DERIVED THEREFROM

CROSS REFERENCE TO RELATED APPLICATIONS

This application claims the benefit of U.S. Provisional Application Ser. No. 60/519,370, filed Nov. 12, 2003.

BACKGROUND OF THE INVENTION

Siloxane-containing polymers and copolymer have been coated on various thermoplastic articles in order to modify their surface characteristics. For example U.S. Pat. No. 6,500,549 to Deppisch et al. describes coating articles with a biocompatible film comprising polydimethylsiloxane blocks. U.S. Pat. No. 5,589,563 to Ward et al. describes coating articles with surface active endgroup-containing polymers that include a linear base polymer having covalently bonded surface active endgroups that modify the surface tension of the base polymer. U.S. Pat. No. 6,395,226 to Plunkett describes a coating for microporous hollow fiber membrane blood oxygenators that increases the resistance of the fibers to passage of blood plasma through the micropores; the coating includes an alkoxysilane/alkylsilane copolymer. This approach has the drawback of requiring separate handling and coating steps to coat the surface-modifying copolymer.

It is also known to modify the surface properties of a thermoplastic resin by blending a siloxane-containing polymer with the bulk thermoplastic resin. For example, U.S. Pat. No. 3,686,355 to Gaines et al. describes blends of a base polymer and a surface-modifying additive that may be a polycarbonate-polysiloxane block copolymer. However, the amount of surface-modifying additive required to obtain the desired surface properties often detracts from the desirable optical properties of the base copolymer.

There is therefore a need for polymer blends that exhibit desirable surface properties without requiring a surface coating step and without compromising the desirable optical properties of the base polymer.

BRIEF DESCRIPTION OF THE INVENTION

The above-described and other drawbacks are alleviated by a composition comprising: a polycarbonate-polysiloxane block copolymer comprising at least one polycarbonate block and at least one polysiloxane block; wherein the polycarbonate block comprises repeating units having the structure

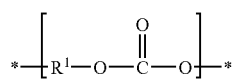

wherein about 60 to 100 percent of the total number of $R^1$ groups are substituted or unsubstituted divalent aromatic organic radicals and 0 to about 40 percent are divalent aliphatic radicals or divalent alicyclic radicals; and wherein the polysiloxane block comprises repeating units having the structure

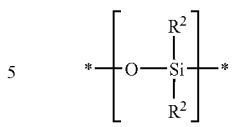

wherein each occurrence of $R^2$ is independently $C_1$–$C_{12}$ hydrocarbyl; and a surface modifying agent comprising at least one polysiloxane segment.

Other embodiments, including a method of preparing the composition and an article comprising the composition, are described in detail below.

DETAILED DESCRIPTION OF THE INVENTION

The present inventors have discovered that polymer blends with modified surface properties—in particular, improved hemocompatibility—may be obtained by blending a polycarbonate-polysiloxane block copolymer comprising at least one polycarbonate block and at least one polysiloxane block, and a surface modifying agent comprising at least one polysiloxane segment. The compositions exhibit improved impact strength compared to commercially available thermoplastics marketed for their hemocompatibility. Depending on the intended use, the polycarbonate-polysiloxane block copolymer may be opaque, translucent, or transparent. Particular transparent polycarbonate-polysiloxane block copolymers have been found to tolerate high levels of the surface modifying agent without losing their transparency and low haze.

One embodiment is a composition, comprising: a polycarbonate-polysiloxane block copolymer comprising at least one polycarbonate block and at least one polysiloxane block; wherein the polycarbonate block comprises repeating units having the structure

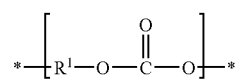

wherein about 60 to 100 percent of the total number of $R^1$ groups are substituted or unsubstituted divalent aromatic organic radicals and 0 to about 40 percent are divalent aliphatic radicals or divalent alicyclic radicals; and wherein the polysiloxane block comprises repeating units having the structure

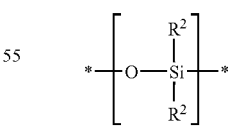

wherein each occurrence of $R^2$ is independently $C_1$–$C_{12}$ hydrocarbyl; and a surface modifying agent comprising at least one polysiloxane segment.

In the polycarbonate block structure above, $R^1$ may preferably be an aromatic organic radical and, more preferably, a radical having the structure

-$A^1$-$Y^1$-$A^2$- wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^2$. For example, $Y^1$ may be —O—, —S—, —S(O)—, —S(O)$_2$—, —C(O)—, or $C_1$–$C_{18}$ hydrocarbylene. Representative $C_1$–$C_{18}$ hydrocarbylene radicals include methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. As used herein, the term "hydrocarbyl", whether used by itself, or as a prefix, suffix, or fragment of another term, refers to a residue that contains only carbon and hydrogen. The residue may be aliphatic or aromatic, straight-chain, cyclic, bicyclic, branched, saturated, or unsaturated. It may also contain combinations of aliphatic, aromatic, straight chain, cyclic, bicyclic, branched, saturated, and unsaturated hydrocarbon moieties. The hydrocarbyl residue, when so stated however, may contain heteroatoms over and above the carbon and hydrogen members of the substituent residue. Thus, when specifically noted as containing such heteroatoms, the hydrocarbyl or hydrocarbylene residue may also contain carbonyl groups, amino groups, hydroxyl groups, or the like, or it may contain heteroatoms within the backbone of the hydrocarbyl residue.

The group $R^1$ may be the residuum of an aromatic dihydroxy compound. Some illustrative, non-limiting examples of suitable dihydroxy compounds include the dihydroxy-substituted hydrocarbons disclosed by name or formula (generic or specific) in U.S. Pat. No. 4,217,438. A nonexclusive list of specific examples of suitable dihydroxy compounds includes the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3-methylphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (α,α'-bis(4-hydroxyphenyl)toluene, bis(4-hydroxyphenyl)acetonitrile, 2,2-bis(4-hydroxyphenyl)propane, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, 2-phenyl-3,3-bis(4-hydroxylphenyl) phthalimidine (PPP), 4,4'-(hexahydro-4,7-methano-indan-5-ylidene)diphenol (TCD, or tricyclodecane bisphenol), 1,1-bis(4-hydroxyphenyl)-3,3,5-trimethylcyclohexane (bisphenol TMC), 4-[1-[3-(4-hydroxyphenyl)-4-methylcyclohexyl]-1-methylethyl]phenol, 4,4'-[1-methyl-4-(1-methylethyl)-1,3-cyclohexandiyl]bisphenol, phenolphthalein, 2-methyl-3,3-bis(p-hydroxyphenyl)phthalimide, 2-butyl-3,3-bis(p-hydroxyphenyl)phthalimide, 2-octyl-3,3-bis(p-hydroxyphenyl)phthalimide, 1,3-bis(4-hydroxyphenyl)-1,3-dialkylcyclohexanes wherein the alkyl groups have one to four carbon atoms (as described, for example, in U.S. Pat. No. 5,344,999), and the like, as well as mixtures comprising the foregoing dihydroxy compounds. In one embodiment, the aromatic dihydroxy compound used to form the $R^1$ group comprises 2,2-bis(4-hydroxyphenyl)propane (bisphenol A).

The polycarbonate-polysiloxane block copolymer comprises a polysiloxane block comprising repeating units having the structure

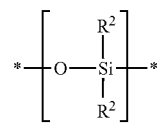

wherein each occurrence of $R^2$ is independently $C_1$–$C_{12}$ hydrocarbyl; and a surface modifying agent comprising at least one polysiloxane segment. A "polysiloxane segment" is defined as a monovalent or divalent polysiloxane moiety comprising at least three of the repeating units defined above. The polysiloxane segment preferably comprises at least five repeating units, more preferably at least 10 repeating units. In one embodiment, each occurrence of $R^2$ is methyl.

In one embodiment, the polysiloxane block has the structure

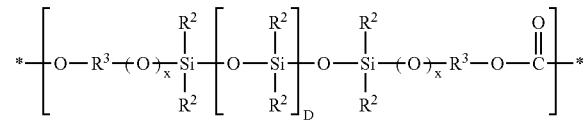

wherein each occurrence of $R^2$ is independently $C_1$–$C_{12}$ hydrocarbyl; each occurrence of $R^3$ is independently $C_6$–$C_{30}$ hydrocarbylene; x is 0 or 1; and D is about 5 to about 120. Within this range, the value of D may specifically be at least 10. Also within this range, the value of D may specifically be up to about 100, more specifically up to about 75, still more specifically up to about 60, even more specifically up to about 30. In one embodiment, x is 0 and each occurrence of $R^3$ independently has the structure

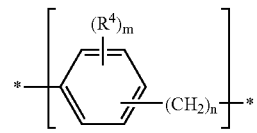

wherein each occurrence of $R^4$ is independently halogen, $C_1$–$C_8$ hydrocarbyl, or $C_1$–$C_8$ hydrocarbyloxy; m is 0 to 4;

and n is 2 to about 12. A hydrogen atom occupies any phenylene ring position not substituted with $R^4$. In another embodiment, each occurrence of $R^3$ independently is a $C_6$–$C_{30}$ arylene radical that is the residue of a diphenol. Suitable polysiloxane blocks include those described in U.S. Pat. No. 4,746,701 to Kress et al., and U.S. Pat. No. 5,502,134 to Okamoto et al. Specifically, the polysiloxane block may be derived from a polydiorganosiloxane having the structure defined in U.S. Pat. No. 4,746,701 to Kress et al. at column 2, lines 29–48:

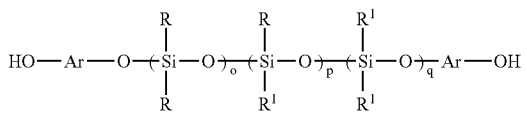

wherein the radicals Ar are identical or different arylene radicals from diphenols with preferably 6 to 30 carbon atoms; R and $R^1$ are identical or different and denote linear alkyl, branched alkyl, halogenated linear alkyl, halogenated branched alkyl, aryl or halogenated aryl, but preferably methyl, and the number of the diorganosiloxy units (the sum o+p+q) is about 5 to about 120. The polysiloxane block may also be derived from the polydimethylsiloxane defined in U.S. Pat. No. 5,502,134 to Okamoto et al. at column 4, lines 1–9:

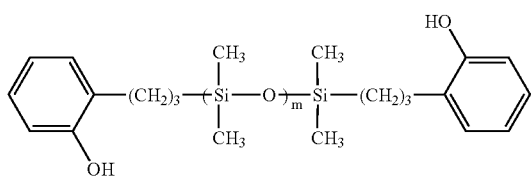

wherein m is about 5 to about 120.

In one embodiment, the polycarbonate-polysiloxane block copolymer consists essentially of the polycarbonate blocks and the polysiloxane blocks. The phrase "consists essentially of" does not exclude end groups derived from a chain terminator, such as phenol, tert-butyl phenol, paracumyl phenol, or the like.

The polycarbonate-polysiloxane block copolymer comprises about 70 to about 99 weight percent of the polycarbonate blocks. Within this range, the content of polycarbonate blocks may be specifically at least 75 weight percent, more specifically at least 85 weight percent, still more specifically at least 90 weight percent. The polycarbonate-polysiloxane block copolymer comprises about 1 to about 30 weight percent of the polysiloxane blocks. Within this range, the content of polysiloxane blocks may specifically be at least about 2 weight percent, more specifically at least about 3 weight percent. Also within this range, the content of polysiloxane blocks may specifically be up to about 25 weight percent, more specifically up to about 15 weight percent, still more specifically up to about 10 weight percent.

The composition may comprise about 1 to about 99.9 weight percent of the polycarbonate-polysiloxane block copolymer. Within this range, the polycarbonate-polysiloxane block copolymer amount may specifically be at least about 3 weight percent, more specifically at least about 5 weight percent, even more specifically at least about 10 weight percent. Also within this range, the polycarbonate-polysiloxane block copolymer amount may specifically be up to about 99 weight percent, more specifically up to about 90 weight percent, even more specifically up to about 50 weight percent.

The composition comprises a surface modifying agent comprising at least one polysiloxane segment. The polysiloxane segment comprises at least three repeating dialkylsiloxane segments. Preferably, the surface modifying agent comprises, in addition to the at least one polysiloxane segment, at least one segment selected from polyolefins, polyesters, polyestercarbonates, polyethers, and polyarylates. Suitable polyolefin segments includes polyethylenes, polypropylenes, poly(vinyl alkanoate)s (e.g., poly(vinyl acetate)), halogenated polyolefins (e.g., polytetrafluoroethylene), and the like, copolymers of the respective olefin monomers, and mixtures of the foregoing polyolefins. Suitable polyester segments include poly(ethylene terephthalate), poly(propylene terephthalate), poly(butylenes terephthalate), poly(cyclohexane dimethanol cyclohexane dicarboxylate), and the like, and mixtures thereof. Suitable polyestercarbonates include those having (a) carbonate repeating units as described above for the polycarbonate segment of the polycarbonate-polysiloxane copolymer, and (b) ester repeating units as described above for the polyester segments. Suitable polyethers include polyethylene oxide, polypropylene oxide, polybutylene oxide, and the like, and copolymers of the respective alkylene oxide monomers. Suitable polyarylates include those comprising structural units derived from (a) one of more aromatic diols such as resorcinol or bisphenol A, and (b) one or more aromatic dicarboxylic acids such as isophthalic acid, terephthalic acid, or naphthalene-2,6-dicarboxylic acid, or the like. Methods of preparing polyolefins, polyesters, polyestercarbonates, polyethers, and polyarylates are known in the art. Methods of linking polysiloxane segments with the above polymer segments are also known in the art. For example, a polysiloxane with eugenol end groups may be prepared and linked to a polyester, polyestercarbonate, or polyarylate segment via an ester-forming or carbonate-forming reaction. A surface modifying agent containing polysiloxane and polyolefin blocks may be prepared by polymerizing an olefin in the presence of a vinyl- or allyl-containing siloxane. As another example, metal-catalyzed hydrosilylation reactions such as those found in U.S. Pat. No. 4,857,583 to Austin et al. and U.S. Pat. No. 5,321,051 to Burkhart et al. can be used to form a polysiloxane with a pendant polyether group.

In one embodiment, the surface modifying agent comprises a polyester-polysiloxane block copolymer. The block copolymer may have a diblock, triblock, tetrablock, radial teleblock, or similar structure. In a preferred embodiment, the surface modifying agent comprises a polyester-polysiloxane-polyester triblock copolymer. Suitable polyester-polysiloxane-polyester triblock copolymers include polycaprolactone-polydimethylsiloxane-polycaprolactone triblock copolymers. Such copolymers may be prepared according to methods known in the art, and they are commercially available, for example, from Goldschmidt as TEGOMER® H-Si 6440P.

The composition may comprise about 0.1 to about 50 weight percent of the surface modifying agent. Within this range, the surface modifying agent amount may be specifically at least 0.25 weight percent, more specifically at least 0.5 weight percent. Also within this range, the surface modifying agent amount may specifically be up to about 30 weight percent, more specifically up to about 10 weight percent, even more specifically up to about 5 weight percent.

The polycarbonate-polysiloxane copolymer and the surface modifying agent, at least, contribute to the total siloxane content of the composition. The total siloxane content of the composition may be about 0.1 to about 30 weight percent. Within this range, the total siloxane content may be specifically at least about 1 weight percent, more specifically at least about 3 weight percent. Also within this range, the total siloxane content may specifically be up to about 20 weight percent, more specifically up to about 15 weight percent, even more specifically up to about 8 weight percent.

In addition to the polycarbonate-polysiloxane block copolymer, the composition may comprise additional polymers, such as, for example, polycarbonates, polyestercarbonates, polyesters, polyarylates, and the like, and mixtures thereof. In a preferred embodiment, the composition comprises a polycarbonate. Suitable polycarbonates are described in the context of the polycarbonate segment of the polycarbonate-polysiloxane copolymer. When present, the additional polymer may be used in an amount of about 0.1 to about 95 weight percent, based on the total weight of the composition. Within this range, the polymer amount may be specifically at least about 1 weight percent, more specifically at least about 20 percent, even more specifically at least about 50 weight percent, still more specifically at least about 70 weight percent, yet more specifically at least about 75 weight percent. Also within this range, the polymer amount may be specifically up to about 90 weight percent, more specifically up to about 85 weight percent.

The composition may, optionally, further comprise an impact modifier. Suitable impact modifiers include elastomer-modified graft copolymers comprising (i) an elastomeric (i.e., rubbery) polymer substrate having a Tg below 0° C., more specifically −40° to −80° C., and (ii) a rigid polymeric superstrate grafted to the elastomeric polymer substrate. As is known, elastomer-modified graft copolymers can be prepared by first providing an elastomeric polymeric backbone. At least one grafting monomer, and specifically two, are then polymerized in the presence of the polymer backbone to obtain the graft copolymer.

Depending on the amount of elastomer-modified polymer present, a separate matrix or continuous phase of ungrafted rigid polymer or copolymer can be simultaneously obtained along with the elastomer-modified graft copolymer. Generally, such impact modifiers comprise 40 to 95 weight percent elastomer-modified graft copolymer and 5 to 60 weight percent graft (co)polymer, based on the total weight of the impact modifier. In another embodiment, such impact modifiers can comprise 50 to 85 weight percent, or can comprise 75 to 85 weight percent rubber-modified graft copolymer, together with 15 to 50 weight percent, more specifically 15 to 25 weight percent graft (co)polymer, based on the total weight of the impact modifier. The ungrafted rigid polymers or copolymers can also be separately prepared, for example by radical polymerization, in particular by emulsion, suspension, solution or bulk polymerization, and added to the impact modifier composition or polycarbonate composition. Such ungrafted rigid polymers or copolymers can have number average molecular weights of 20,000 to 200,000 atomic mass units.

Suitable materials for use as the elastomeric polymer backbone include, for example, conjugated diene rubbers; copolymers of a conjugated diene with less than 50 weight percent of a copolymerizable monomer; $C_1$–$C_8$ alkyl (meth) acrylate elastomers; olefin rubbers such as ethylene propylene copolymers (EPR) or ethylene-propylene-diene monomers (EPDM); silicone rubbers; elastomeric $C_1$–$C_8$ alkyl (meth)acrylates; elastomeric copolymers of $C_1$–$C_8$ alkyl (meth)acrylates with butadiene and/or styrene; or combinations comprising at least one of the foregoing elastomers.

Suitable conjugated diene monomers for preparing the polymeric backbone may have the formula

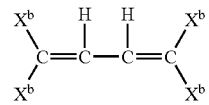

where each $X^b$ is independently hydrogen, $C_1$–$C_5$ alkyl, chlorine, bromine, or the like. Examples of conjugated diene monomers that can be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, chloro- and bromo-substituted butadienes such as dichlorobutadiene, bromobutadiene, dibromobutadiene, and the like, as well as mixtures comprising at least one of the foregoing conjugated diene monomers. Specific conjugated diene homopolymers include polybutadiene and polyisoprene.

Copolymers of a conjugated diene rubber can also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula

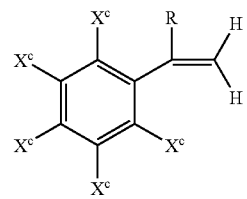

where each $X^c$ is independently hydrogen, $C_1$–$C_{12}$ alkyl, $C_3$–$C_{12}$ cycloalkyl, $C_6$–$C_{12}$ aryl, $C_7$–$C_{12}$ aralkyl, $C_7$–$C_{12}$ alkaryl, $C_1$–$C_{12}$ alkoxy, $C_3$–$C_{12}$ cycloalkoxy, $C_6$–$C_{12}$ aryloxy, chloro, bromo, or hydroxy, and R is hydrogen, $C_1$–$C_5$ alkyl, bromo, or chloro. Examples of the suitable monovinylaromatic monomers that can be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations thereof. Styrene and/or alpha-methylstyrene are commonly used as monomers copolymerizable with the conjugated diene monomer. Mixtures of the foregoing monovinyl monomers and monovinylaromatic monomers can also be used.

Suitable impact modifiers are known in the art. Non-limiting examples are described in U.S. Pat. No. 5,859,119 to Hoefflin and U.S. Pat. No. 5,126,428 to Freitag et al.; and U.S. Patent Application Publication No. 20020111428 A1 to Gaggar et al. The impact modifier often comprises one of several different rubbery modifiers, such as graft or core-shell rubbers, or combinations of two or more of these modifiers. Examples include the groups of modifiers known as acrylic rubbers, ASA rubbers, diene rubbers, organosiloxane rubbers, silicone rubbers, EPDM rubbers, SBS or SEBS rubbers, ABS rubbers, MBS rubbers, and glycidyl ester-based materials.

The term "acrylic rubber modifier" can refer to multi-stage, core-shell, interpolymer modifiers having a cross-linked or partially cross-linked (meth)acrylate rubbery core phase, preferably butyl acrylate. Associated with this cross-linked acrylic ester core is an outer shell of an acrylic or styrenic resin, preferably methyl methacrylate or styrene, which interpenetrates the rubbery core phase. Incorporation of small amounts of other monomers such as acrylonitrile or (meth)acrylonitrile within the resin shell also provides suitable impact modifiers. The interpenetrating network is formed when the monomers that constitute the resin phase are polymerized and cross-linked in the presence of the previously-polymerized and cross-linked (meth)acrylate rubbery.

For some embodiments of this invention, the preferred rubbers are graft or core-shell structures, with a rubbery component having a $T_g$ below about 0° C., and preferably between about −40° C. and about −80° C. These materials comprise poly(alkyl acrylates) or polyolefins grafted with PMMA (polymethyl methacrylate) or SAN (styrene-acrylonitrile). Preferably, the rubber content is at least about 40 weight percent, and most preferably between about 60 and about 90 weight percent. Especially suitable rubbers are the butadiene core-shell polymers of the type available from Rohm & Haas, for example, Paraloid® EXL2600.

In some embodiments, the impact modifier will comprise a two-stage polymer having a butadiene-based rubbery core, and a second stage polymerized from methyl methacrylate, alone or in combination with styrene. Other suitable rubbers are the ABS types Blendex® 336 and 415, available from GE Specialty Chemicals. Both rubbers are based on the impact modifier resin of SBR rubber.

Although these mentioned impact modifiers appear to be very suitable, there are many more modifiers that can be used and are known to those skilled in the polymer arts. In general, selection of a particular impact modifier will depend on a variety of factors. They include: cost, availability, room temperature and low-temperature impact properties; refractive index; compatibility with the polycarbonate-polysiloxane block copolymer and the surface modifying agent; as well as overall optical and physical properties desired for the polymer system. An impact modifier with a refractive between about 1.51 and about 1.58 may be used, as long as it possesses reasonable clarity. The amount of impact modifier employed may depend on many of these same factors. The required amount of impact resistance is usually the primary factor. In some cases, the impact modifier, when present in the composition, may be used in an amount of about 1 to about 30 weight percent, based on the total weight of the composition.

The composition may, optionally, further comprise additives. Such additives include fillers, reinforcing agents, thermal stabilizers, antioxidants, light stabilizers (especially ultraviolet light absorbers), gamma-irradiation stabilizers, plasticizers, colorants, extenders, antistatic agents, catalyst quenchers, lubricants, mold releasing agents, processing agents, blowing agents, flame retardants, anti-drip agents, and the like, and mixtures thereof. Such additives are known in the art and commercially available. Those of ordinary skill in the art know how to select such additives and determine their amounts, depending on the intended use of the composition.

As the composition is defined as comprising multiple components, it will be understood that each component is chemically distinct, particularly in the instance that a single chemical compound may satisfy the definition of more than one component.

In one embodiment, the composition (or articles prepared therefrom) may exhibit one or more of the following desirable properties: a percent transmission of at least 70%, more specifically at least 80%, measured according to ASTM D1003 at a thickness of 3.2 millimeters; a percent haze of less than or equal to 10%, more specifically less than or equal to 6%, measured according to ASTM D1003 at a thickness of 3.2 millimeters; a notched Izod impact strength of about 500 joules per meter (J/m) to about 1,000 J/m, more specifically at least 600 J/m to about 900 J/m, measured according to ASTM D256 at 23° C.; an unnotched Izod impact strength of about 1,000 J/m to about 3,000 J/m, more specifically about 1,500 J/m to about 2,400 J/m, still more specifically about 2,000 J/m to about 2,200 J/m, measured at 23° C. according to ASTM D4812; a blood platelet percent retention of blood exposed to the composition, measured according to ISO 10993-4:2002(E) and the procedure of Example 10 and 11 below, that is at least 5 percent higher, more specifically at least 10 percent higher, even more specifically at least 20 percent higher, than the blood platelet percent retention of blood exposed to a composition consisting of a bisphenol A polycarbonate homopolymer having a weight average molecular weight of about 20,000 to about 30,000 atomic mass units. With respect to the last property, which is an objective indicator of hemocompatibility, the terms "5 percent higher", "10 percent higher", and "20 percent higher" refer to the absolute difference between the platelet retention percent of blood exposed to the inventive composition for 30 minutes and the platelet retention percent of blood exposed to the polycarbonate homopolymer for 30 minutes. For example, using actual data from Comparative Example 15 and Example 10, if the platelet retention percent of blood exposed to an inventive composition is 93.5%, and the platelet retention percent of blood exposed to a polycarbonate homopolymer is 73.4%, then the platelet retention percent for blood exposed to the inventive composition would be 20.1 percent higher (93.5−73.4) than the platelet retention percent for blood exposed to the polycarbonate homopolymer.

One embodiment is a composition, comprising: an aromatic polycarbonate; a polyester-polysiloxane block copolymer; and a polycarbonate-polysiloxane block copolymer comprising at least one polycarbonate block and at least one polysiloxane block; wherein the polycarbonate block comprises repeating units having the structure

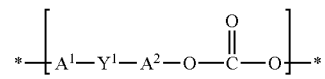

wherein each of $A^1$ and $A^2$ is independently a monocyclic divalent aryl radical; and wherein $Y^1$ is selected from be —O—, —S—, —S(O)—, —S(O)$_2$—, —C(O)—, and $C_1$–$C_{18}$ hydrocarbylene; and wherein the polysiloxane block has the structure

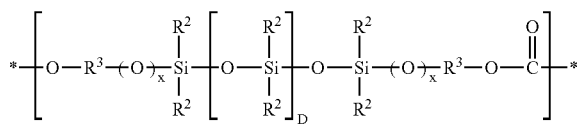

wherein each occurrence of $R^2$ is independently $C_1$–$C_{12}$ hydrocarbyl; each occurrence of $R^3$ is independently $C_6$–$C_{30}$ hydrocarbylene; x is 0 or 1; and D is 5 to about 120.

Another embodiment is a composition, comprising: about 60 to about 95 weight percent of a bisphenol A polycarbonate; about 0.1 to about 10 weight percent of a polycaprolactone-poly(dimethylsiloxane)-polycaprolactone triblock copolymer; and about 5 to about 40 weight percent of a polycarbonate-polysiloxane block copolymer comprising at least one polycarbonate block and at least one polysiloxane block; wherein the polycarbonate block comprises repeating units having the structure

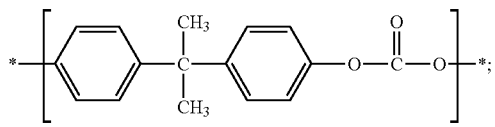

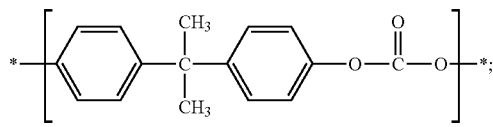

and wherein the polysiloxane block comprises repeating units having the structure and wherein the polysiloxane block comprises repeating units having the structure

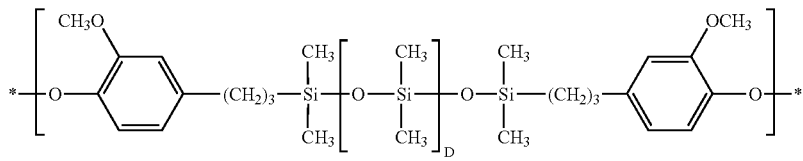

wherein D is about 5 to about 100.

Another embodiment is a composition, comprising: about 70 to about 90 weight percent of a bisphenol A polycarbonate; about 0.2 to about 5 weight percent of a polycaprolactone-poly(dimethylsiloxane)-polycaprolactone triblock copolymer; and about 10 to about 25 weight percent of a polycarbonate-polysiloxane block copolymer comprising at least one polycarbonate block and at least one polysiloxane block; wherein the polycarbonate block comprises repeating units having the structure

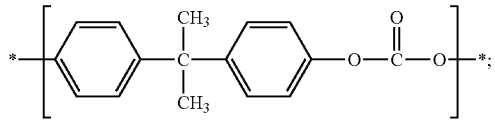

and wherein the polysiloxane block comprises repeating units having the structure

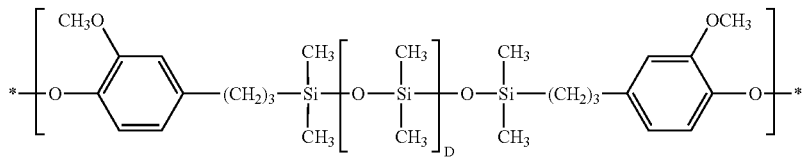

wherein D is about 30 to about 70.

Another embodiment is a composition, comprising: about 75 to about 85 weight percent of a bisphenol A polycarbonate; about 0.5 to about 2 weight percent of a polycaprolactone-poly(dimethylsiloxane)-polycaprolactone triblock copolymer; and about 15 to about 20 weight percent of a polycarbonate-polysiloxane block copolymer comprising at least one polycarbonate block and at least one polysiloxane block; wherein the polycarbonate block comprises repeating units having the structure

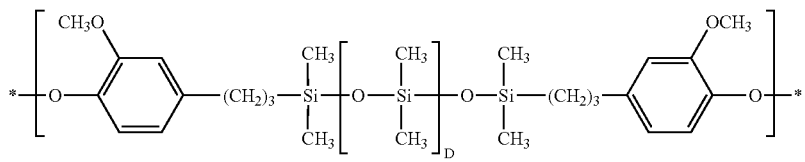

wherein D is about 40 to about 60.

Another embodiment is a method of preparing a thermoplastic composition, comprising: blending a surface modifying agent comprising at least one polysiloxane segment; and a polycarbonate-polysiloxane block copolymer comprising at least one polycarbonate block and at least one polysiloxane block, to form an intimate blend; wherein the polycarbonate block comprises repeating units having the structure

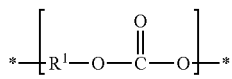

wherein about 60 to 100 percent of the total number of $R^1$ groups are substituted or unsubstituted divalent aromatic organic radicals and 0 to about 40 percent are divalent aliphatic radicals or divalent alicyclic radicals; and wherein the polysiloxane block comprises repeating units having the structure

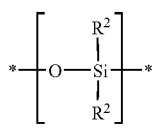

wherein each occurrence of $R^2$ is independently $C_1$–$C_{12}$ hydrocarbyl.

Other embodiments include articles comprising any of the abovedescribed compositions. For example, the article may comprise a film, sheet, molded object, membrane, or composite, wherein the film, sheet, molded object or composite has at least one layer comprising the composition. Compositions of the invention may be converted to articles using common thermoplastic processes such as film and sheet extrusion, injection molding, gas-assist injection molding, extrusion molding, compression molding, blow molding, and the like. Film and sheet extrusion processes may include melt casting, blown film extrusion, and calendaring. Co-extrusion and lamination processes may be employed to form composite multi-layer films or sheets. Single or multiple layers of coatings may further be applied to the single or multi-layer substrates to impart additional properties such as scratch resistance, ultraviolet light resistance, aesthetic appeal, etc. Coatings may be applied through standard application techniques such as rolling, spraying, dipping, brushing, or flow-coating. Film and sheet of the invention may alternatively be prepared by casting a solution or suspension of the composition in a suitable solvent onto a substrate, belt or roll followed by removal of the solvent.

Oriented films may be prepared through blown film extrusion or by stretching cast or calendared films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

Compositions of the invention may be converted to multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described below:

1. Providing a single or multi-layer thermoplastic substrate having optionally one or more colors on the surface, for instance, using screen printing or a transfer dye.
2. Conforming the substrate to a mold configuration such as by forming and trimming a substrate into a three dimensional shape and fitting the substrate into a mold having a surface which matches the three dimensional shape of the substrate.
3. Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

All ranges disclosed herein are inclusive of the endpoints, and the endpoints are combinable with each other.

The invention is further illustrated by the following non-limiting examples.

COMPARATIVE EXAMPLES 1–5

These comparative examples illustrate that the desirable high transmittance and low haze of polycarbonate resins are compromised when relatively low levels of a surface-modifying agent are added. Five compositions were prepared varying in the amount of surface-modifying agent. Each composition contained a first bisphenol A polycarbonate (BPA-PC) having a weight average molecular weight of about 30,000 AMU, and a second bisphenol A polycarbonate having a weight average molecular weight of about 21,800 AMU. Comparative Example 1 contained no surface-modifying agent. Comparative Examples 2–4 contained from 0.10 to 1.0 weight percent of a polycaprolactone-polydimethylsiloxane-polycaprolactone triblock copolymer ("LSL copolymer") having a total weight average molecular weight of about 22,000 AMU and a polydimethylsiloxane content of about 44 weight percent. The LSL copolymer was obtained from Goldschmidt as TEGOMER® H-Si 6440P. Compositions were prepared by blending all components and melt processing in an extruder. The barrel temperature for melt processing of the polycarbonate was 280° C. but can range from 260° C. to 310° C. Test specimens having dimensions of 8 centimeters by 10 centimeters by 0.32 centimeter were prepared by injection molding. Percent transmission and haze were measured according to ASTM D1003 at a thickness of 3.2 millimeters. The silicon content of the surface was determined by electron spectroscopy for chemical analysis (ESCA) at a 15° take-off angle. The results are representative of the silicon content of the surface of the test specimen to a depth of about 2 nanometers. Tensile modulus values, expressed in megaPascals (MPa), were measured according to ASTM D638 at 23° C. Notched Izod impact strength values, expressed in joules per meter (J/m), were measured according to ASTM D256 at 23° C. Compositions and results are presented in Table 1. All component amounts are expressed in parts by weight. The results show that although the addition of small amounts of LSL to bisphenol A polycarbonate has the desirable effect of increasing the silicon content on the surface of molded articles, it also has the undesirable effects of reducing percent transmission and increasing percent haze.

TABLE 1

|  | C. Ex. 1 | C. Ex. 2 | C. Ex. 3 | C. Ex. 4 | C. Ex. 5 |
|---|---|---|---|---|---|
| COMPOSITIONS |  |  |  |  |  |
| BPA-PC, 30,000 AMU | 18.00 | 18.00 | 18.00 | 18.00 | 18.00 |
| BPA-PC, 21,800 AMU | 82.00 | 82.00 | 82.00 | 82.00 | 82.00 |
| LSL | 0.00 | 0.10 | 0.25 | 0.50 | 1.00 |
| PROPERTIES |  |  |  |  |  |
| % Transmittance | 91.4 | 87.6 | 71.9 | 53.7 | 44.3 |
| % Haze | 0.3 | 1.6 | 22.8 | 85.5 | 100.0 |
| Surface silicon content (wt %) | 0.0 | 0.3 | 0.4 | — | 1.3 |
| Tensile Modulus (MPa) | 2,248 | 2,261 | 2,234 | 2,268 | 2,248 |
| Notched Izod impact strength (J/m) | 747 | 731 | 721 | 737 | 747 |

EXAMPLES 1–6, COMPARATIVE EXAMPLE 6

These examples demonstrate that compositions comprising a polycarbonate-polysiloxane block copolymer and a siloxane-containing surface-modifying agent exhibit high surface concentrations of silicon while maintaining good optical properties. Seven compositions were prepared varying primarily in the amount of surface-modifying agent and the presence or absence of polycarbonate homopolymer. The polycarbonate-polysiloxane block copolymer was prepared following a procedure similar to that of Example 2 in U.S. patent application Ser. No. 10/797,418 to DeRudder et al. It had a weight average molecular weight of about 23,500 AMU, a total polydimethylsiloxane content of 6 weight percent, and polydimethylsiloxane segments with an average chain length of about 50 repeat units. Compositions and properties are summarized in Table 2. The results show that Examples 1–5, consisting of polycarbonate-polysiloxane block copolymer and LSL triblock copolymer, exhibited optical properties similar to Comparative Example 6 without any LSL. Example 5 and 6 illustrate that, compared to blends of polycarbonate homopolymer and LSL, compositions comprising polycarbonate-polysiloxane copolymer, carbonate homopolymer, and LSL can tolerate much higher concentrations of LSL before optical properties are degraded.

TABLE 2

|  | C. Ex. 6 | Ex. 1 | Ex. 2 | Ex. 3 | Ex. 4 | Ex. 5 | Ex. 6 |
|---|---|---|---|---|---|---|---|
| COMPOSITIONS |  |  |  |  |  |  |  |
| BPA-PC, 30,000 AMU | — | — | — | — | — | 10.5 | 9.9 |
| BPA-PC, 21,800 AMU | — | — | — | — | — | 5.70 | 5.40 |
| Polycarbonate-polysiloxane | 100.00 | 99.50 | 99.25 | 99.00 | 98.50 | 78.60 | 74.50 |
| LSL | — | 0.50 | 0.75 | 1.00 | 1.50 | 5.00 | 10.00 |
| PROPERTIES |  |  |  |  |  |  |  |
| % Transmittance | 86.1 | 84.6 | 87.5 | 87.3 | 86.7 | 71.2 | 53.5 |
| % Haze | 1.6 | 2.7 | 1.7 | 1.8 | 1.9 | 13.7 | 51.6 |
| Surface silicon content (wt %) | 4.5 | — | — | — | 6.5 | — | — |

EXAMPLE 7, COMPARATIVE EXAMPLES 7 AND 8

These examples demonstrate that the surface-modifying agent LSL cannot induce optical clarity in a composition prepared from an opaque polycarbonate-polydimethylsiloxane copolymer. Three compositions were prepared varying primarily in the types and amounts of polycarbonate-polysiloxane copolymer, and the amount of surface-modifying agent. The material abbreviated in Table 3 as "Clear polycarbonate-polysiloxane copolymer" is the same as the copolymer used in the examples above; i.e., it had a weight average molecular weight of about 23,500 AMU, a total polydimethylsiloxane content of 6 weight percent, and polydimethylsiloxane segments with a chain length of about 50 units. The material abbreviated in Table 3 as "Opaque polycarbonate-polysiloxane copolymer" has a weight average molecular weight of about 30,000, a total polydimethylsiloxane content of 20 weight percent, and polydimethylsiloxane segments with a chain length of about 50 units. Compositions and optical properties are presented in Table 3. The results show that addition of 1% LSL to a composition comprising opaque polycarbonate-polysiloxane copolymer did not improve the optical properties (Comparative Example 8 versus Comparative Example 7). The results also show that a blend of polycarbonate homopolymer, clear polycarbonate-polysiloxane copolymer and 1% LSL had excellent optical properties.

TABLE 3

|  | C. Ex. 7 | C. Ex. 8 | Ex. 7 |
|---|---|---|---|
| COMPOSITIONS |  |  |  |
| BPA-PC, 30,000 AMU | 37.5 | 37.5 | 16.0 |
| BPA-PC, 21,800 AMU | 44.0 | 44.0 | 32.5 |
| Clear Polycarbonate-polysiloxane | 17.5 | 17.5 | 50.0 |
| Opaque Polycarbonate-polysiloxane | 17.5 | 17.5 | — |
| LSL | 0.0 | 1.0 | 1.0 |
| PROPERTIES |  |  |  |
| % Transmittance | 20.0 | 19.6 | 83.0 |
| % Haze | 100.0 | 99.5 | 3.1 |

EXAMPLE 8, COMPARATIVE EXAMPLES 9–11

Four thermoplastic compositions were tested for two hemocompatibility responses: change in platelet count after incubation with the composition for one hour, and change in intensity of leukocyte activity. The apparatus and test procedures are described in detail in C. H. Gemmell et al., *J. Lab. Clin. Med.* 1995, volume 125, no. 2, pages 276–287. An abbreviated description of the test procedure follows. Each thermoplastic composition was tested as a sample tube 25 centimeters long by 1.57 millimeters inner diameter. Silastic tubing was used to attach test materials to the apparatus. The following steps were followed for sample preparation.
1. Warm sample tubes at 37° C. for 30 minutes prior to testing.
2. After discarding the first milliliter, collect blood from volunteer in syringe preloaded with 5 Units/mL of heparin.
3. Attach material to one arm of the low shear apparatus.
4. Through the loose end, inject 450 microliters of blood into the tube through the Silastic connection using a 1 mL syringe. Attach the loose end to the low shear apparatus and allow to rock gently at 37° C. for 1 hour.
5. For the time of the experiment, set aside at 37° C. a resting whole blood sample (400 microliters) in a sealed centrifuge tube.
6. At the end of the experiment, drain blood into microcentrifuge tubes using filtered air.
7. Transfer 30 microliters of blood from each sample into microcentrifuge tubes and add 3 microliters of the platelet agonist, thrombin peptide (serine-phenylalanine-leucine-leucine-arginine-asparagine; SFLLRN). Place tubes in the 37° C. incubator for 20 minutes to activate platelets.
8. Immediately process blood samples for flow cytometry (see below).
9. Flush test segments with phosphate-buffered saline (PBS) using a syringe until all blood is rinsed off.

Flow cytometry was conducted using the following steps.
1. Using PBS containing calcium and magnesium, prepare flow cytometry tubes to receive blood samples.

Platelet analysis requires 2 sets of tubes:
(Tubes A) 50 μL of PBS+2 μL of fluroescein isothiocyanate-conjugated monoclonal antibody against human CD41a (FITC-CD41a; α IIb/IIIa)+3 μL of phycoerythrin-conjugated monoclonal antibody against human CD62P (PE-CD62P) solution (dilution 1:10 in PBS) (α P-selectin)
(Tubes A') same as Tubes A except will receive 5 μL aliquots of blood from the SF-activated samples.

Leukocyte CD11b analysis requires 2 sets of tubes:
(Tubes B) 50 μL of PBS+5 μL of fluroescein isothiocyanate-conjugated monoclonal antibody against human CD11b (FITC-CD11b)+1 μL of phycoerythrin-conjugated monoclonal antibody against human CD45 (PE-CD45)
(Tubes B') same as B plus 6 μL of phorbal 12-myristate 13-acetate (PMA) solution (dilution 1:10 in PBS)
2. Add 20 μL of blood to each of the tubes for leukocyte analysis (i.e., B and B') and 5 μL of blood to the tubes for platelet analysis (i.e., A). Add 5 μL of blood from the SF-activated samples to Tubes A'. To the remaining blood samples of approximately 300 μL, add 6 μL of 200 mM EDTA for use in cell counts.
3. Incubate tubes for 20 minutes at room temperature.
4. Add to tubes A and A' only, 200 μl of each of PBS and 2% paraformaldehyde and store immediately at 4° C. until analysis.
5. For leukocyte analysis (tubes B and B'), add 100 μL of Optilyse C RBC lysing solution (5× the amount of blood being lysed). Vortex briefly immediately after adding lysing buffer to each tube.
6. Incubate for 10 minutes at room temperature until lysing is complete (i.e., clear red solution with no cloudiness).
7. Centrifuge for 2 minutes at 1300 rpm at room temperature.
8. Quickly invert tubes to discard lysing solution.
9. If a red pellet can be observed, repeat steps 5 to 7.
10. Add 100 μL each of PBS and 2% paraformaldehyde.
11. Store at 4° C. until analysis.

For each blood sample, platelet and leukocyte counts were recorded on the multiparameter, automated Coulter AcT diff 2 hematology analyzer.

The transparent polycarbonate-polysiloxane copolymer used in Comparative Example 9 and Example 8 contained 6 weight percent polysiloxane as polydimethylsiloxane segments with a chain length of about 50 units. It was prepared following a procedure similar to that of Example 2 in U.S. patent application Ser. No. 10/797,418 of DeRudder et al. The composition of Comparative Example 10 is representative of a commercially available material marketed as exhibiting improved hemocompatibility. It included 99 parts by weight of a methyl methacrylate-acrylonitrile-butadiene-styrene copolymer (MABS) obtained as TERLUX 2802 from BASF and 1% TEGOMER® HSi 6440P from Degussa Goldschmidt. Compositions and properties are summarized in Table 4. The platelet count values, expressed as mean and standard deviation, are based on five samples per composition. The control, in which samples were incubated without any thermoplastic composition, had a platelet count value of $(204\pm29)\times10^6$/mL. For the thermoplastic compositions, higher values of platelet counts are more desirable. The results show that Comparative Example 9, Example 8, and Comparative Example 11 had statistically indistinguishable platelet counts, which were lower than (inferior to) the platelet count of Comparative Example 10. The platelet count values could not be explained as correlating with the total siloxane content of the thermoplastic compositions. The leukocyte activation results are expressed in arbitrary fluorescence intensity units. Lower values are more desirable. In this test, the control (no thermoplastic material) had a value of 13±6. The results show that Comparative Example 9 and Example 8, each containing polycarbonate-polysiloxane block copolymer, exhibited lower (superior) leukocyte activation values compared to Comparative Examples 10 and 11.

TABLE 4

|  | C. Ex. 9 | Ex. 8 | C. Ex. 10 | C. Ex. 11 |
|---|---|---|---|---|
| COMPOSITIONS |  |  |  |  |
| Polycarbonate-polysiloxane | 57.91 | 57.91 | — | — |
| BPA-PC, 21,800 AMU | 27.96 | 27.96 | — | 35.0 |
| BPA-PC, 30,000 AMU | 13.98 | 13.98 | — | 65.0 |
| Phosphite stabilizer | 0.06 | 0.06 | — | 0.6 |
| Water | 1.00 | 1.00 | — | 0 |
| LSL | — | 1.01 | 1.01 | — |
| MABS | — | — | 100.00 | — |
| PROPERTIES |  |  |  |  |
| Platelet count ($10^6$/mL) | 78 ± 14 | 87 ± 24 | 115 ± 20 | 68 ± 19 |
| Leukocyte activation (arb. units) | 25 ± 7 | 23 ± 9 | 46 ± 4 | 61 ± 7 |

EXAMPLE 9, COMPARATIVE EXAMPLES 13 AND 14

These examples demonstrate that hemocompatibility may be improved by employing a polycarbonate-polysiloxane block copolymer with reduced polysiloxane segment length, leading to compositions that exhibit hemocompatibility comparable to that a commercially available composition marketed for its hemocompatibility. These experiments used the platelet retention and leukocyte activation procedures described above. Comparative Example 13 is the same as Comparative Example 10, above, and is representative of a commercially available material marketed as exhibiting improved hemocompatibility. Comparative Examples 14 and Example 9 consisted primarily of a polycarbonate-polysiloxane block copolymer having a total polysiloxane content of 3 weight percent and polydimethylsiloxane segments with a chain length of about 10 units. Comparative Example 14 consisted entirely of this copolymer, whereas Example 9 further included 1 weight percent of polycaprolactone-polysiloxane-polycaprolactone triblock copolymer. Compositions and properties are summarized in Table 5. The platelet count control (no thermoplastic material) exhibited a platelet count value of $(225\pm50)\times10^6$/mL. The platelet count results show that all three compositions exhibited statistically indistinguishable performance. In other words, the compositions with short-siloxane-segment polycarbonate-polysiloxane block copolymer performed as well as the Comparative Example 13 composition, which is representative of a commercially available thermoplastic blend marketed for its hemocompatibility. In the leukocyte activation test, the control exhibited a value of 12±3. The leukocyte activation results show that the Comparative Ex. 14 and Example 9 compositions, each with short-siloxane-segment polycarbonate-polysiloxane block copolymer, performed better than the Comparative Example 13 composition. It was unexpected that the total siloxane was not a predictor of hemocompatibility performance.

TABLE 5

|  | C. Ex. 13 | C. Ex. 14 | Ex. 9 |
|---|---|---|---|
| COMPOSITIONS |  |  |  |
| Polycarbonate-polysiloxane | — | 100.00 | 100.00 |
| LSL | 1.01 | — | 1.01 |
| MABS | 100.00 | — | — |
| PROPERTIES |  |  |  |
| Platelet count ($10^6$/mL) | 121 ± 30 | 101 ± 26 | 97 ± 34 |
| Leukocyte activation (arb. units) | 45 ± 4 | 30 ± 8 | 30 ± 8 |

EXAMPLES 10 AND 11, COMPARATIVE EXAMPLES 15 AND 16

These experiments show that the addition of a surface modifying agent to a polycarbonate-polysiloxane copolymer can improve the hemocompatibility of the composition. Four compositions were tested for their effect on platelet count, using a procedure different from that described above. The procedure was conducted in two steps, the first being exposure of blood to the test materials, and the second being measurement of platelet count. To expose blood to the test materials, blood from human volunteers was collected into the anticoagulant, citrate phosphate dextrose. Citrate phosphate dextrose solution contains 0.299 grams of citric acid anhydrate USP, 2.63 grams of sodium citrate dehydrate USP, 0.222 grams of monobasic sodium phosphate monohydrate USP, 2.90 grams of dextrose, 0.027 grams of adenine USP, and 100 milliliters of water. Forty-nine (49) milliliters of this buffer was used to collect 350 milliliter of blood. The test materials, provided as molded articles having dimensions of 50.8 millimeters by 76.2 millimeters by 3.175 millimeters (2 inches by 3 inches by 0.125 inch), were placed in wells of polystyrene Petri dishes and immersed in phosphate buffered saline, which was removed before the test materials were exposed to blood. To each well 25 milliliters of blood was added and a 0.5 milliliter sample was collected immediately for cell counting. The remaining 24.5 milliliters of blood was exposed to the materials for 30 minutes under agitation at 75±5 rotations per minute using an Environ shaker thermostatted at 35±2° C. Three samples were tested for each material. Three empty polystyrene flasks were exposed with blood as reference. The count reduction was analyzed by detecting the counts in initial and 30 minute samples using a COBAS MINOS Vet Automated Haematology Analyzer, manufactured by Roche Diagnostics, France. The equipment was calibrated using a traceable standard reference control, Liquichek 16, trilevel controls (Bio-Rad, USA) before measurement. The platelet retention (%) was calculated using the formula, Platelet retention (%)=(Final concentration of platelets×100)/(Initial concentration of platelets).

Comparative Example 15 consisted of bisphenol A polycarbonate homopolymers plus minor amounts of mold release agent and phosphite stabilizer. Comparative Example 16 included a polycarbonate-polysiloxane copolymer containing 17.5% total siloxane as segments having a chain length of about 50 units, bisphenol A polycarbonate homopolymers, phosphite stabilizer, and water. Examples 10 and 11 were replicates, each containing a majority of bisphenol A polycarbonate, plus clear polycarbonate-polysiloxane copolymer, phosphite stabilizer, and 1 weight percent of polycaprolactone-polysiloxane-polycaprolactone triblock copolymer obtained from Goldschmidt as TEGOMER® H-Si 6440P. Compositions and properties are summarized in Table 6. The results show that the platelet retentions of Examples 10 and 11, with polycarbonate-polysiloxane copolymer and polycaprolactone-polysiloxane-polycaprolactone triblock copolymer, were greater than (superior to) those of Comparative Examples 15 and 16. These results show that the addition of a surface-modifying agent, such as polycaprolactone-polysiloxane-polycaprolactone triblock copolymer, to a composition comprising polycarbonate-polysiloxane copolymer can improve the hemocompatibility of the composition.

TABLE 6

|  | C. Ex. 15 | C. Ex. 16 | Ex. 10 | Ex. 11 |
| --- | --- | --- | --- | --- |
| COMPOSITIONS |  |  |  |  |
| Polycarbonate-polysiloxane | — | 57.91 | 17.33 | 17.33 |
| BPA-PC, 21,800 AMU | 89.65 | 27.96 | 24.75 | 24.75 |
| BPA-PC, 30,000 AMU | 9.96 | 13.98 | 56.93 | 56.93 |
| Mold release agent | 0.27 | — | — | — |
| Phosphite stabilizer | 0.03 | 0.06 | 0.06 | 0.06 |
| Water | — | 0.10 | — | — |
| LSL | — | — | 0.99 | 0.99 |
| PROPERTIES |  |  |  |  |
| Platelet retention (%) | 73.4 ± 5.4 | 83.7 ± 4.2 | 93.5 ± 5.7 | 89.9 ± 3.0 |

EXAMPLES 12–14, COMPARATIVE EXAMPLES 17 AND 18

These experiments illustrate variation of the surface modifying agent. The controls were a polycarbonate homopolymer (Comparative Example 17) and a polycarbonate-polysiloxane copolymer (Comparative Example 18). The polycarbonate homopolymer was a bisphenol A polycarbonate having a weight average molecular weight of 21,800 AMU. The polycarbonate-polysiloxane block copolymer had 6% siloxane by weight and siloxane segments having a chain length of about 50 units. Examples 12–14 each contained 99 weight percent polycarbonate-polysiloxane block copolymer and 1 weight percent of a surface modifying agent. In Example 12, the surface modifying agent was the polycaprolactone-polysiloxane-polycaprolactone triblock copolymer obtained from Goldschmidt as TEGOMER® H-Si 6440P. In Example 13, the surface modifying agent was a water-soluble polyethylene oxide-polydimethylsiloxane-polyethylene oxide triblock copolymer having a total siloxane content of 11 weight percent and polyethylene oxide segments with a number average molecular weight of 900 AMU. It was obtained from GE Silicones as SF1388. In Example 14, the surface modifying agent had the structure

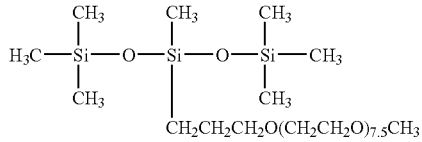

where 7.5 represents the statistical average of the number of ethylene oxide units per molecule. It was obtained from GE Silicones as Silwet L-77® surfactant. Percent platelet count retention was determined according to the procedure of Examples 10 and 11. Compositions and results are summarized in Table 7. The results show that each of the compositions containing polycarbonate-polysiloxane block copolymer and surface modifying agent exhibited higher average percent platelet retention than the polycarbonate-polysiloxane block copolymer alone or the polycarbonate homopolymer.

TABLE 7

|  | C. Ex. 17 | C. Ex. 18 | Ex. 12 | Ex. 13 | Ex. 14 |
| --- | --- | --- | --- | --- | --- |
| COMPOSITIONS |  |  |  |  |  |
| Polycarbonate-polysiloxane | — | 100.0 | 99.0 | 99.0 | 99.0 |
| BPA-PC, 21,800 AMU | 100.0 | — | — | — | — |
| LSL | — | — | 1.0 | — | — |
| Polyether-substituted polysiloxane | — | — | — | 1.0 | — |
| Polyether-polysiloxane-polyether triblock copolymer | — | — | — | — | 1.0 |
| PROPERTIES |  |  |  |  |  |
| Platelet retention (%) | 66.1 ± 4.8 | 72.5 ± 2.6 | 87.5 ± 6.7 | 82.8 ± 5.3 | 76.6 ± 5.6 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another.

The invention claimed is:

1. A composition, comprising a blend of:
a polycarbonate-polysiloxane block copolymer comprising at least one polycarbonate block and at least one polysiloxane block; wherein the polycarbonate block comprises repeating units having the structure

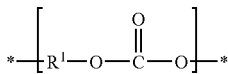

wherein about 60 to 100 percent of the total number of $R^1$ groups are substituted or unsubstituted divalent aromatic organic radicals and 0 to about 40 percent are divalent aliphatic radicals or divalent alicyclic radicals; and wherein the polysiloxane block comprises repeating units having the structure

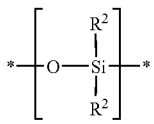

wherein each occurrence of $R^2$ is independently $C_1$–$C_{12}$ hydrocarbyl; and a surface modifying agent comprising at least one polysiloxane segment wherein the surface modifying agent comprises, in addition to the at least one polysiloxane segment, at least one segment selected from polyolefins, polyesters, polyestercarbonates, polyethers, and polyarylates.

2. The composition of claim 1, wherein the polycarbonate-polysiloxane block copolymer consists essentially of the polycarbonate blocks and the polysiloxane blocks.

3. The composition of claim 1, wherein $R^1$ has the structure

wherein each of $A^1$ and $A^2$ is a monocyclic divalent aryl radical; and wherein $Y^1$ is selected from be —O—, —S—, —S(O)—, —S(O)$_2$—, —C(O)—, and $C_1$–$C_{18}$ hydrocarbylene.

4. The composition of claim 1, wherein the substituted or unsubstituted divalent aromatic organic radicals comprise the residuum of 2,2-bis(4-hydroxyphenyl)propane.

5. The composition of claim 1, wherein each occurrence of $R^2$ is methyl.

6. The composition of claim 1, wherein the polysiloxane block has the structure

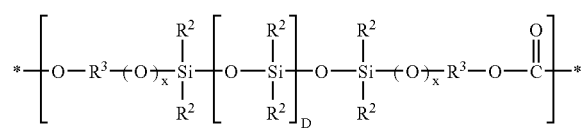

wherein each occurrence of $R^2$ is independently $C_1$–$C_{12}$ hydrocarbyl; each occurrence of $R^3$ is independently $C_6$–$C_{30}$ hydrocarbylene; x is 0 or 1; and D is about 5 to about 120.

7. The composition of claim 6, wherein D is about 5 to about 75.

8. The composition of claim 6, wherein D is about 10 to about 60.

9. The composition of claim 6, wherein each occurrence of x is 0, and each occurrence of $R^3$ independently has the structure

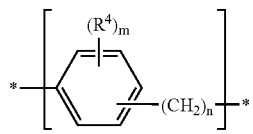

wherein each occurrence of $R^4$ is independently halogen, $C_1$–$C_8$ hydrocarbyl, or $C_1$–$C_8$ hydrocarbyloxy; m is 0 to 4; and n is 2 to about 12.

10. The composition of claim 1, wherein the polycarbonate-polysiloxane block copolymer comprises about 70 to about 99 weight percent of the polycarbonate blocks.

11. The composition of claim 1, wherein the polycarbonate-polysiloxane block copolymer comprises about 1 to about 30 weight percent of the polysiloxane blocks.

12. The composition of claim 1, wherein the composition comprises about 0.1 to about 30 weight percent of total polysiloxane blocks.

13. The composition of claim 1, comprising about 1 to about 99.9 weight percent of the polycarbonate-polysiloxane block copolymer.

14. The composition of claim 1, wherein the surface modifying agent comprises a polyester-polysiloxane block copolymer.

15. The composition of claim 1, wherein the surface modifying agent comprises a polycaprolactone-polydimethylsiloxane-polycaprolactone triblock copolymer.

16. The composition of claim 1, comprising about 0.1 to about 50 weight percent of the surface modifying agent.

17. The composition of claim 1, further comprising a polymer selected from polycarbonates, polyestercarbonates, polyesters, polyarylates, and mixtures thereof.

18. The composition of claim 1, further comprising an impact modifier.

19. The composition of claim 1, further comprising an additive selected from fillers, reinforcing agents, thermal stabilizers, antioxidants, light stabilizers, gamma-irradiation stabilizers, plasticizers, colorants, extenders, antistatic agents, catalyst quenchers, lubricants, mold releasing agents, processing agents, blowing agents, flame retardants, anti-drip agents, and mixtures thereof.

20. The composition of claim 1, having a percent transmission of at least 70% measured according to ASTM D1003 at a thickness of 3.2 millimeters.

21. The composition of claim 1, having a percent haze of less than or equal to 10% measured according to ASTM D1003 at a thickness of 3.2 millimeters.

22. The composition of claim 1, having a notched Izod impact strength of at about 500 to about 1,000 joules per meter, measured according to ASTM D256 at 23° C.

23. The composition of claim 1, wherein human blood exposed to the composition for 30 minutes at 35° C. has a platelet retention percent, measured according to the procedure of Examples 10 and 11, that is at least 5 percent higher than the platelet retention percent of blood exposed to a composition consisting of a bisphenol A polycarbonate homopolymer having a weight average molecular weight of about 20,000 to about 30,000 atomic mass units.

24. A composition, comprising:
a polycarbonate-polysiloxane block copolymer comprising at least one polycarbonate block and at least one polysiloxane block; wherein the polycarbonate block comprises repeating units having the structure

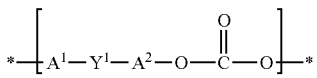

wherein each of $A^1$ and $A^2$ is independently a monocyclic divalent aryl radical; and wherein $Y^1$ is selected from be —O—, —S—, —S(O)—, —S(O)$_2$—, —C(O)—, and $C_1$–$C_{18}$ hydrocarbylene; and wherein the polysiloxane block has the structure

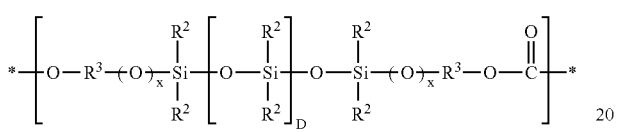

wherein each occurrence of $R^2$ is independently $C_1$–$C_{12}$ hydrocarbyl; each occurrence of $R^3$ is independently $C_6$–$C_{30}$ hydrocarbylene; x is 0 or 1; and D is 5 to about 120;

an aromatic polycarbonate; and a polyester-polysiloxane block copolymer.

25. The composition according to claim 24, comprising:

about 5 to about 99 weight percent of a polycarbonate-polysiloxane block copolymer comprising at least one polycarbonate block and at least one polysiloxane block; wherein the polycarbonate block comprises repeating units having the structure

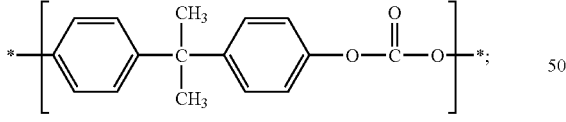

and wherein the polysiloxane block comprises repeating units having the structure

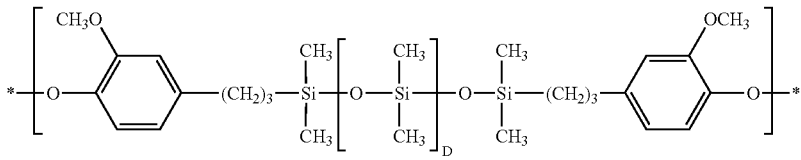

wherein D is about 5 to about 100;

about 1 to about 95 weight percent of a bisphenol A polycarbonate; and about 0.1 to about 10 weight percent of a polycaprolactone-poly(dimethylsiloxane)-polycaprolactone triblock copolymer.

26. The composition according to claim 25, comprising:

about 10 to about 25 weight percent of a polycarbonate-polysiloxane block copolymer comprising at least one polycarbonate block and at least one polysiloxane block; wherein the polycarbonate block comprises repeating units having the structure

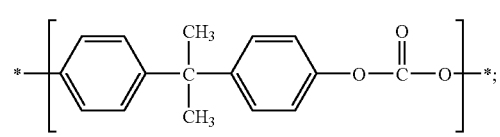

and wherein the polysiloxane block comprises repeating units having the structure

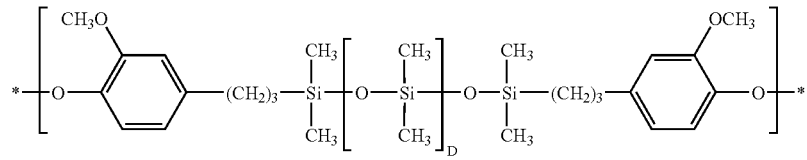

wherein D is about 30 to about 70;

about 70 to about 90 weight percent of a bisphenol A polycarbonate; and about 0.2 to about 5 weight percent of a polycaprolactone-poly(dimethylsiloxane)-polycaprolactone triblock copolymer.

27. The composition according to claim 26, comprising:

about 15 to about 20 weight percent of a polycarbonate-polysiloxane block copolymer comprising at least one polycarbonate block and at least one polysiloxane block; wherein the polycarbonate block comprises repeating units having the structure

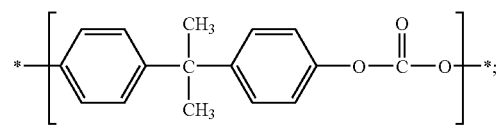

and wherein the polysiloxane block comprises repeating units having the structure

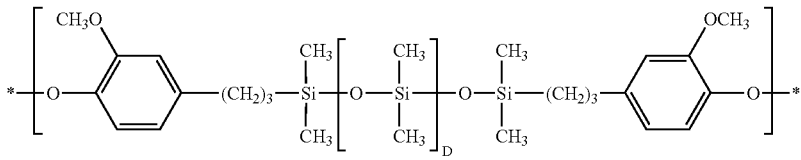

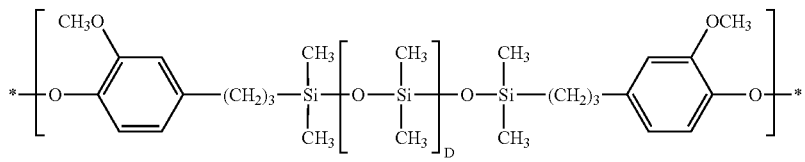

wherein D is about 40 to about 60;
about 75 to about 85 weight percent of a bisphenol A polycarbonate; and
about 0.5 to about 2 weight percent of a polycaprolactone-poly(dimethylsiloxane)-polycaprolactone triblock copolymer.

28. A method of preparing a thermoplastic composition, comprising:
blending a polycarbonate-polysiloxane block copolymer comprising at least one polycarbonate block and at least one polysiloxane block; wherein the polycarbonate block comprises repeating units having the structure

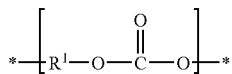

wherein about 60 to 100 percent of the total number of $R^1$ groups are substituted or unsubstituted divalent aromatic organic radicals and 0 to about 40 percent are divalent aliphatic radicals or divalent alicyclic radicals; and wherein the polysiloxane block comprises repeating units having the structure

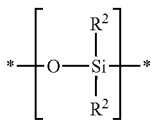

wherein each occurrence of $R^2$ is independently $C_1$–$C_{12}$ hydrocarbyl; and a surface modifying agent comprising at least one polysiloxane segment wherein the surface modifying agent comprises, in addition to the at least one polysiloxane segment, at least one segment selected from polyolefins, polyesters, polyestercarbonates, polyethers, and polyarylates,
to form an intimate blend.

29. An article comprising the composition of claim 1.
30. The article of claim 29 comprising a film, sheet, molded object, membrane, or composite.
31. The article of claim 30 wherein the film, sheet, molded object or composite has at least one layer comprising the composition.
32. An article comprising the composition of claim 24.

* * * * *